(12) United States Patent
Barrick et al.

(10) Patent No.: US 11,531,548 B1
(45) Date of Patent: Dec. 20, 2022

(54) FAST PERFECT ISSUE OF DEPENDENT INSTRUCTIONS IN A DISTRIBUTED ISSUE QUEUE SYSTEM

(71) Applicant: International Business Machines Corporation, Armonk, NY (US)

(72) Inventors: Brian D. Barrick, Pflugerville, TX (US); Dung Q. Nguyen, Austin, TX (US); Brian W. Thompto, Austin, TX (US); Tu-An T. Nguyen, Austin, TX (US); Salma Ayub, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/358,183

(22) Filed: Jun. 25, 2021

(51) Int. Cl.
*G06F 9/38* (2018.01)
*G06F 9/30* (2018.01)

(52) U.S. Cl.
CPC ........ *G06F 9/3838* (2013.01); *G06F 9/30098* (2013.01); *G06F 9/3836* (2013.01)

(58) Field of Classification Search
CPC .... G06F 9/3838; G06F 9/3836; G06F 9/3828; G06F 9/3826
See application file for complete search history.

(56) References Cited

U.S. PATENT DOCUMENTS

| | | | | |
|---|---|---|---|---|
| 5,699,537 A | * | 12/1997 | Sharangpani | G06F 9/3857 712/E9.046 |
| 5,761,476 A | * | 6/1998 | Martell | G06F 9/3857 712/217 |
| 6,101,597 A | * | 8/2000 | Colwell | G06F 9/3824 712/E9.046 |
| 6,212,626 B1 | * | 4/2001 | Merchant | G06F 9/3863 712/E9.05 |
| 6,330,657 B1 | | 12/2001 | Col et al. | |
| 10,120,693 B2 | | 11/2018 | Ayub et al. | |
| 2007/0250687 A1 | * | 10/2007 | Burky | G06F 9/3838 712/214 |

(Continued)

OTHER PUBLICATIONS

Al-Zawawi; "Transparent Control Independence (TCI)"; Graduate Faculty of North Carolina State University;2007; 178p.

(Continued)

*Primary Examiner* — Keith E Vicary
(74) *Attorney, Agent, or Firm* — Cantor Colburn LLP; Brian Restauro

(57) ABSTRACT

Embodiments for fast perfect issue of dependent instructions in a distributed issue queue system. Producer information of a producer instruction is inserted in a lookup entry in a lookup table, the lookup entry being allocated to a register. It is determined that the register corresponding to the lookup entry is a source for a dependent instruction. Responsive to storing the dependent instruction in an issue queue, the producer information is stored in a back-to-back entry of a back-to-back wakeup table, the back-to-back entry corresponding to the dependent instruction. The producer instruction is issued which causes the producer information of the producer instruction to be sent to the back-to-back wakeup table. It is determined that there is a match between the producer information and the back-to-back entry for the dependent instruction, and the dependent instruction is caused to issue based on the match.

20 Claims, 9 Drawing Sheets

(56) References Cited

U.S. PATENT DOCUMENTS

| | | | | |
|---|---|---|---|---|
| 2008/0244224 A1* | 10/2008 | Sassone | ............... | G06F 9/3838 |
| | | | | 712/23 |
| 2016/0378504 A1* | 12/2016 | Brownscheidle | ..... | G06F 9/3838 |
| | | | | 712/214 |
| 2018/0196678 A1* | 7/2018 | Thompto | .............. | G06F 9/3838 |
| 2020/0004546 A1* | 1/2020 | Genden | ................ | G06F 9/3853 |
| 2020/0042321 A1* | 2/2020 | Genden | ................ | G06F 9/3885 |

OTHER PUBLICATIONS

Anonymous, "Issue Queue bypass readiness predictor"; IP.com; IPCOM000193323D; Feb. 18, 2010; 2 p.

Anonymous; "Instruction steering policy for balanced utilization of a bifurcated unified issue queue"; IP.com ; IPCOM000179961D; Mar. 3, 2009; 3 p.

Sharkey; "Non-uniform Instruction Scheduling"; J.C. Cunha and P.D. Medeiros (Eds): Euro-Par 2005, LNCS 3648, pp. 540-549, 2005. 10p.

Subramanian; "HeDGE: Hybrid Dataflow Graph Execution in the Issue logic"; The University of Texas at Austin; 2009. 24p.

* cited by examiner

US 11,531,548 B1

FAST PERFECT ISSUE OF DEPENDENT INSTRUCTIONS IN A DISTRIBUTED ISSUE QUEUE SYSTEM

BACKGROUND

The present invention generally relates to computer systems, and more specifically, to computer-implemented methods, computer systems, and computer program products configured and arranged for fast perfect issue of dependent instructions in a distributed issue queue system.

A pipeline microprocessor has a path, channel, or pipeline that is divided into stages that perform specific tasks. Each of the specific tasks are part of an overall operation that is directed by a programmed instruction. Each of the programmed instructions or macro instructions in a software application program is executed in sequence by the microprocessor. As a programmed instruction enters the first stage of the pipeline, certain tasks are accomplished. The instruction is then passed to subsequent stages for accomplishment of subsequent tasks. Following completion of a final task, the instruction completes execution and exits the pipeline. Execution of programmed instructions by a pipeline microprocessor is very much analogous to the manufacture of items on an assembly line. One of the obvious aspects of any assembly line is that there are multiple items resident in the line in successive stages of assembly during any given point in time. The same is true for a pipeline microprocessor. During any cycle of a pipeline clock signal, there are multiple instructions present in the various stages, with each of the instructions being at successive levels of completion. Therefore, microprocessors allow overlapping execution of multiple instructions with the same circuitry. The circuitry is usually divided up into stages and each stage processes a specific part of one instruction at a time, passing the partial results to the next stage.

SUMMARY

Embodiments of the present invention are directed to computer-implemented methods for fast perfect issue of dependent instructions in a distributed issue queue system. A non-limiting example computer-implemented method includes inserting producer information of a producer instruction in a lookup entry in a lookup table, the lookup entry being allocated to a register. The computer-implemented method includes determining that the register corresponding to the lookup entry is a source for a dependent instruction, responsive to storing the dependent instruction in an issue queue, storing the producer information in a back-to-back entry of a back-to-back wakeup table, the back-to-back entry corresponding to the dependent instruction. The computer-implemented method includes issuing the producer instruction which causes the producer information of the producer instruction to be sent to the back-to-back wakeup table, determining that there is a match between the producer information and the back-to-back entry for the dependent instruction, and allowing the dependent instruction to issue based on the match.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide computer-implemented methods, computer systems, and computer program products arranged and configured for fast perfect issue of dependent instructions in a distributed issue queue system. One or more embodiments provide improved processor performance by increasing an opportunity for a data-consumer instruction to execute back-to-back with its producer instruction. A lookup table tracks issue queue locations of dispatched producer instructions. When a data-consumer instruction is dispatched, its producer's location is read from the lookup table and stored in a consumer issue queue entry. The producer's location is compared against an issue vector for determining that the producer instruction is issuing, and this determination enables/causes the consumer instruction to be issued on a next clock cycle, thereby issuing for execution the producer instruction and the data-consumer instruction back-to-back (B2B).

In related technologies, current designs require that the instruction producing a result, and its dependent instruction, be in the same Issue Queue (ISQ) row in order to be issued back-to-back. This limits the back-to-back capability of the processor core, since back-to-back instructions must be dispatched together from a dispatcher in the same dispatch group.

In accordance with one or more embodiments, a mechanism is provided that allows the producer instruction that produces results, and its dependent instruction (data-consumer instruction), to exist in any of the Issue Queue slots in a Distributed Queue system and thus be dispatched at different times. The new logic is able to identify dependent instructions from any of the Issue Queue slots and issue them back-to-back to the producer instruction. This robust back-to-back capability improves processor core performance. Data-consumer instruction and dependent instruction, which are dependent on the producer instruction (e.g., the results of the producer instruction), may be used interchangeably.

Figure 1:
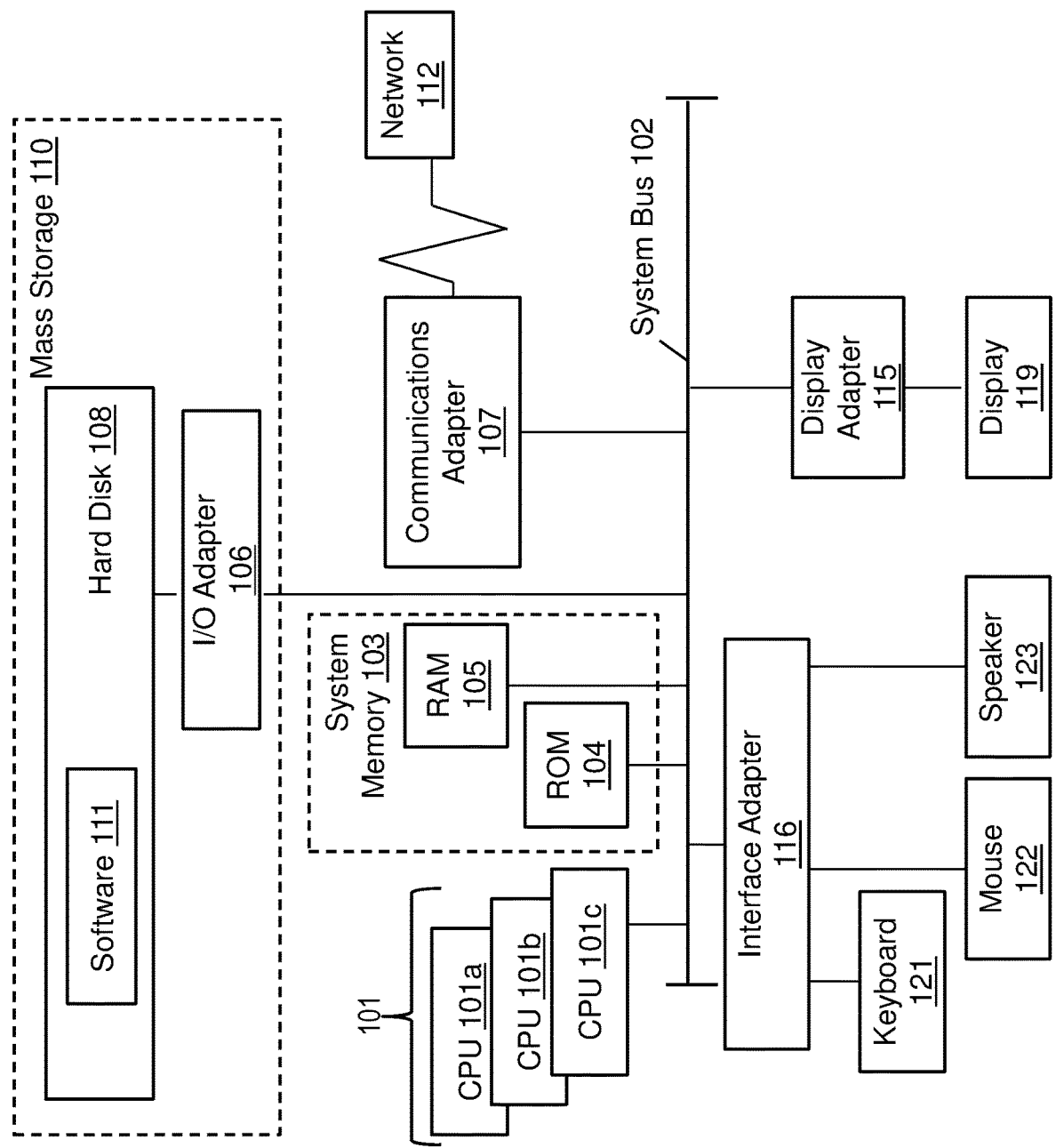
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
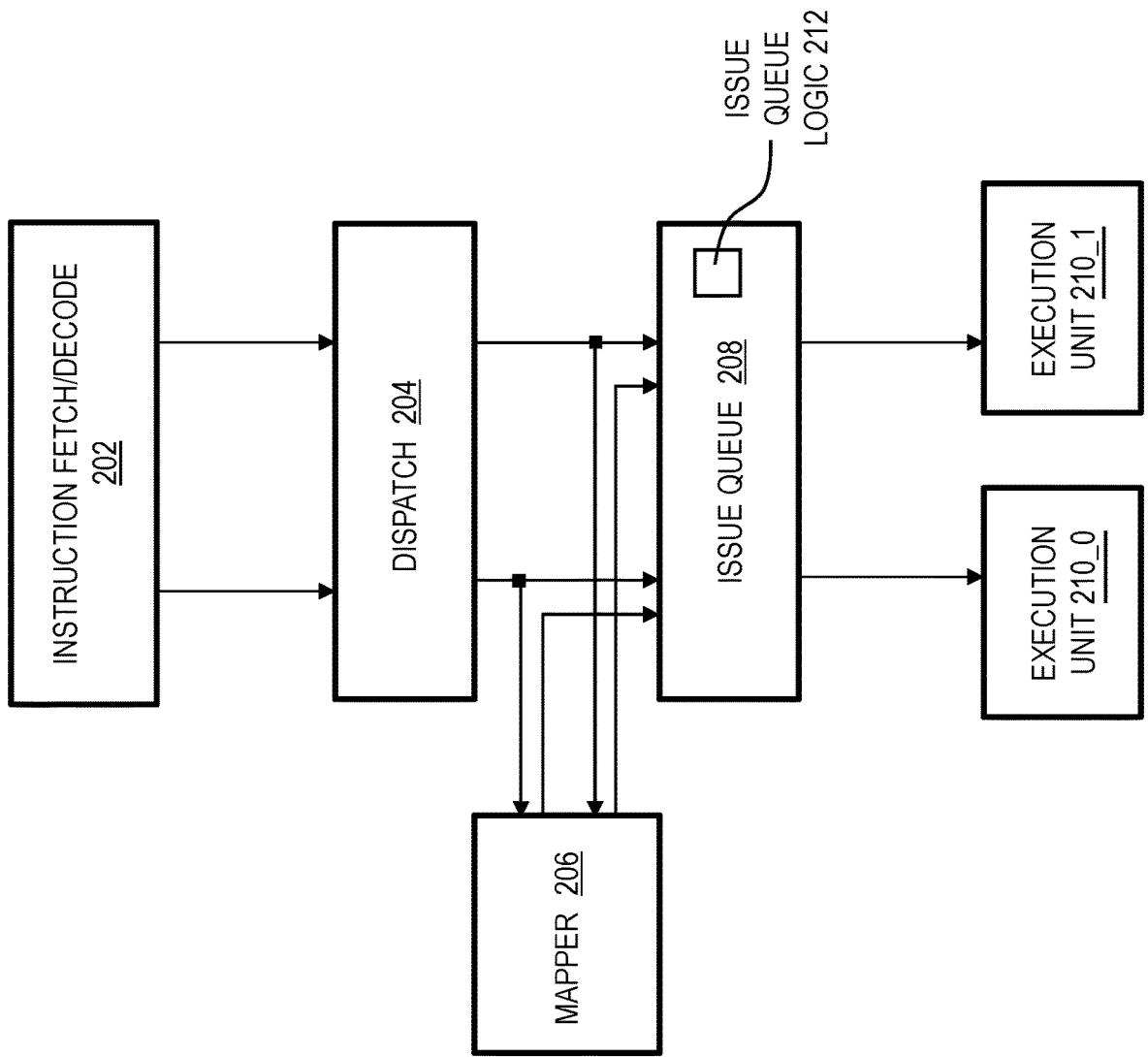
FIG. 2 depicts a block diagram of an example instruction flow of modules in a processor in accordance with one or more embodiments of the present invention.

FIG. 2 is a block diagram of an example instruction flow of modules in a processor 200 according to one or more embodiments of the inventions. Processor 200 could be representative of any of the processors 101 discussed in computer system 100 in FIG. 1. It should be appreciated that the example instruction flow is a high-level architecture of an out-of-order pipeline and is not meant to include every detail of out-of-order pipeline. The out-of-order pipeline can include fewer or more modules/blocks as understood by one or ordinary skill in the art. The various components, modules, engines, etc., described regarding FIG. 2 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the modules described herein can be a combination of hardware and programming. The programming can be processor executable instructions stored on a tangible memory, and the hardware can include processing circuitry for executing those instructions. Alternatively or additionally, the modules can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. Further, the modules can include various logic circuits to function as discussed herein.

An instruction fetch and decode module 202 is configured to fetch the instruction, which involves retrieving an instruction (which is represented by a number or sequence of numbers) from program memory. The instruction's location (address) in program memory is determined by the program counter (sometimes called the "instruction pointer"), which stores a number that identifies the address of the next instruction to be fetched. After an instruction is fetched, the program counter is incremented by the length of the instruction so that it will contain the address of the next instruction in the sequence. Often, the instruction to be fetched is retrieved from relatively slow memory. However, caches and pipeline architectures are used to avoid causing the processor to stall while waiting for the instruction to be returned. During decode of the instruction, instruction fetch and decode module 202 is configured to convert the instruction into signals that control other parts of the processor 200. The instruction fetched from memory determines what the processor will do. Although not separately shown, instruction fetch and decode module 202 may be composed of a fetcher for fetching the instruction and an instruction decoder for decoding the instructions. The way in which the instruction is interpreted is defined by the processor's instruction set architecture (ISA). Often, one group of bits (i.e., a "field") within the instruction, called the opcode, indicates which operation is to be performed, while the remaining fields usually provide supplemental information required for the operation, such as the operands. Those operands may be specified as a constant value (called an immediate value), or as the location of a value that may be a processor register or a memory address, as determined by some addressing mode.

A dispatch module 204 is configured to cause instruction dispatch to an issue queue 208 as well as to a mapper module 206. Mapper module 206 is configured to receive the instruction. In response, mapper module 206 compares the source operands of the instruction (e.g., a producer instruction) to the destination operand of another instruction (e.g., data-consumer instruction (i.e., dependent instruction)) and determines a match, indicating that the data-consumer instruction is dependent on the producer instruction. The mapper passes this information to the issue queue 208. Using issue queue 208, the instruction waits in the queue until its input operands are available. The instruction can leave the queue before older instructions. The instruction is issued to the appropriate execution unit (also called functional unit) and executed by that execution unit. Example execution units are execution units 210_0 and 210_1, generally referred to as execution units 210. Each execution unit 210 is configured to perform the operations and calculations as instructed by the instruction.

In some issue queues, when a dependent instruction is dependent upon a producer instruction and back-to-back issue is desired, that dependent instruction has to be stored in an odd entry directly next to the producer instruction stored in an even entry, thereby requiring the producer and dependent instruction to be stored as an even and odd pair in the same row of the issue queue. This allows the dependent instruction to issue back-to-back to the producer instruction. In other issue queues, for normal wake up which is not back-to-back, this requires reading producer information out of the queue and then doing full Register Tag compare which takes too long to perform back-to-back issue. One or more embodiments are configured to provide freedom from the requirement of having the dependent instruction be stored in an entry immediately beside the producer instruction, while still allowing the dependent instruction to issue back-to-back to the producer instruction. In one or more embodiments the dependent instruction can be in any issue queue entry, which does not need to be an odd entry next to the even entry of its producer, in the issue queue. Accordingly, no even and odd pair (or pairing) is required to achieve the back-to-back issue according to one or more embodiments.

Figure 3:
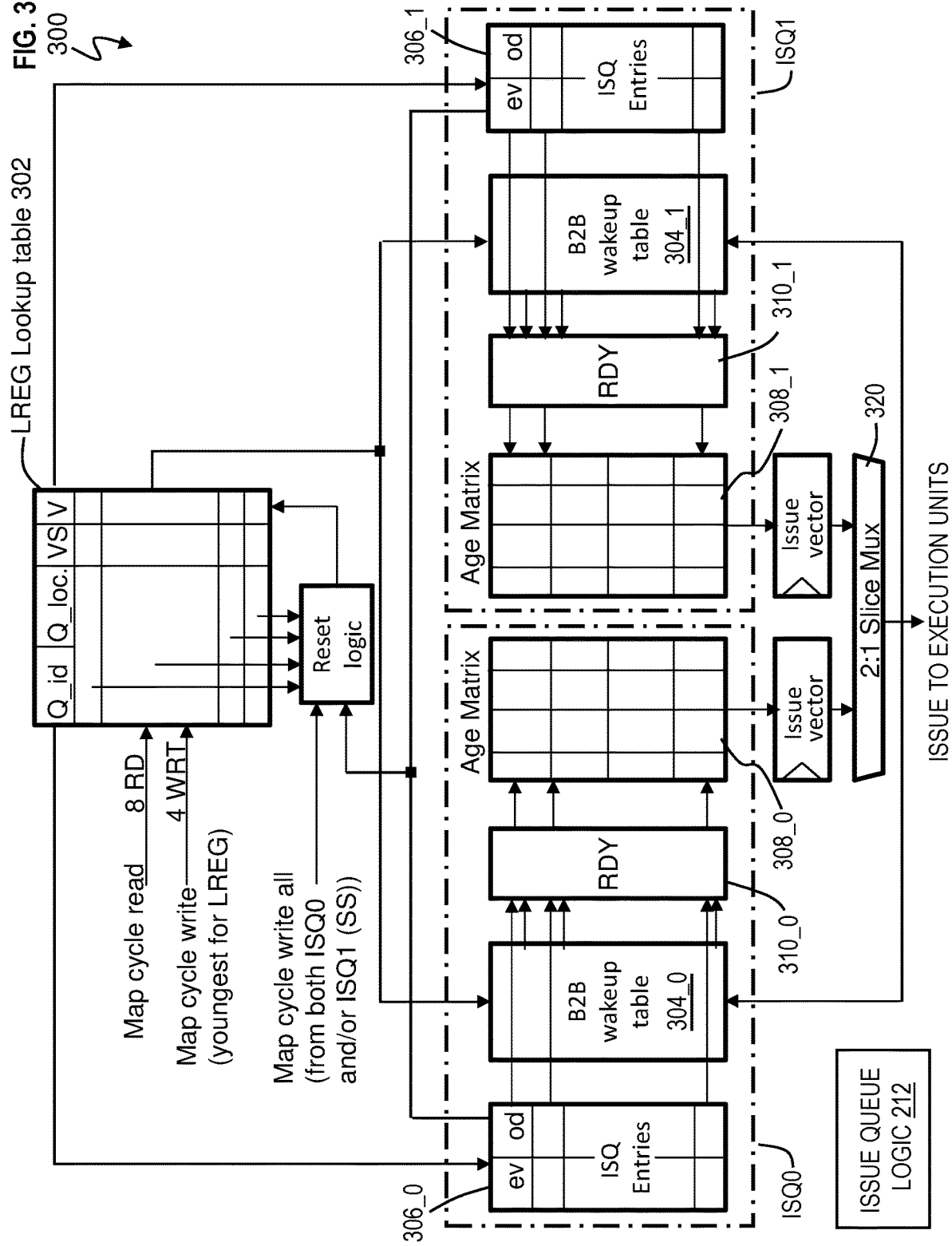
FIG. 3 depicts a block diagram illustrating further details of a distributed issue queue in accordance with one or more embodiments of the present invention.

FIG. 3 is a block diagram illustrating further details of a distributed issue queue 300 in accordance with one or more embodiments of the present invention. FIG. 3 depicts fast perfect issue of dependent instructions in the distributed issue queue 300. Distributed issue queue 300 can be implemented in issue queue 208, be included in issue queue 208, and/or include functionally of issue queue 208 to function in processor 200. Distributed issue queue 300 includes two example issue queues ISQ0 and ISQ1. Although two issue queues ISQ0 and ISQ1 are illustrated in distributed issue queue 300, more than two issue queues can be used in distributed issue queue 300. Elements of computer system 100 may be used in conjunction with distributed issue queue 300 to execute in one or more processors 101, and processor 200 may be implemented in processors 101.

Figure 4:
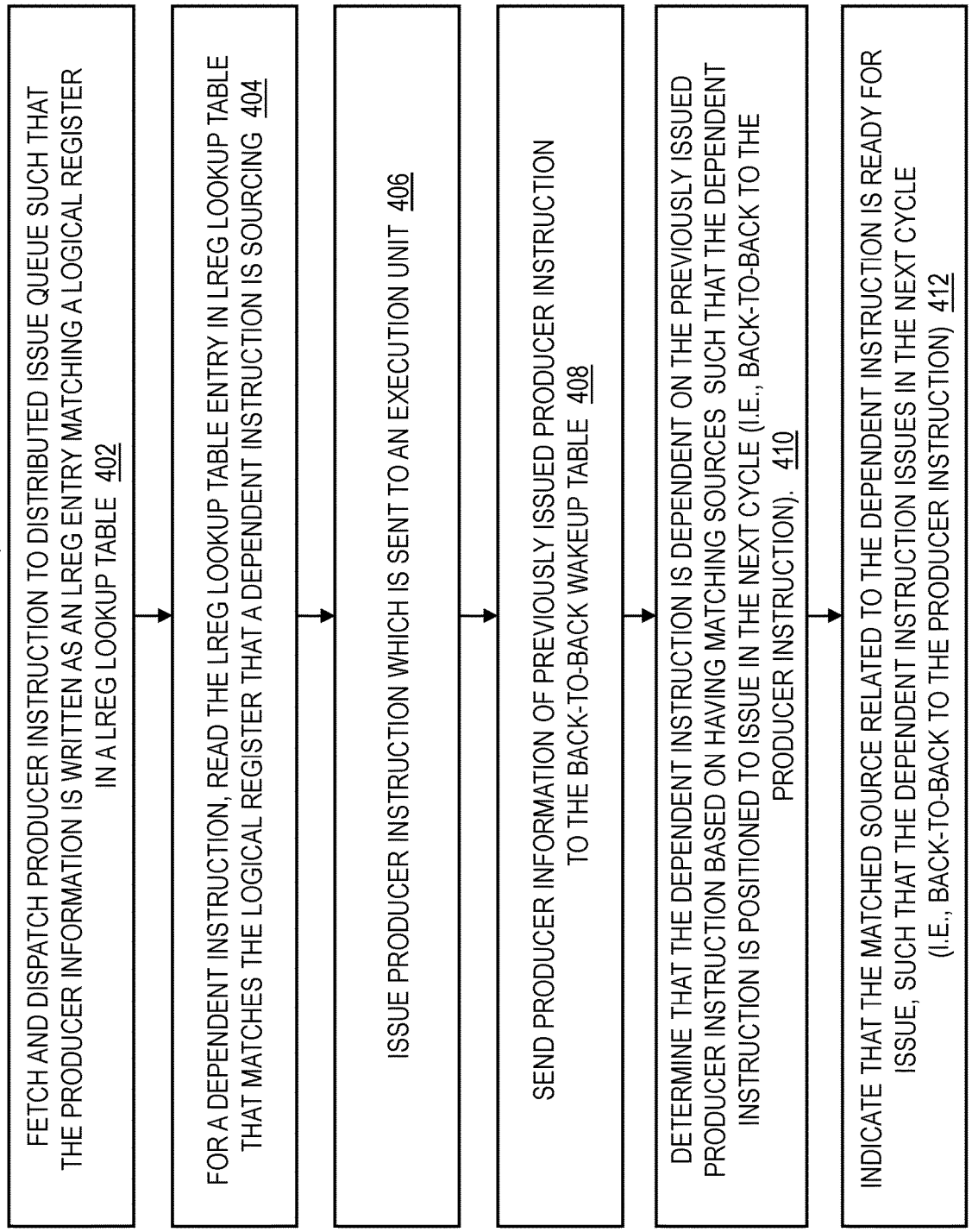
FIG. 4 is a flowchart of a back-to-back issue process for perfect issue of dependent instructions in a distributed issue queue in accordance with one or more embodiments of the invention.

FIG. 4 is a flowchart of a back-to-back issue process 400 for perfect issue of dependent instructions in distributed issue queue 300 in accordance with one or more embodiments of the present invention. The back-to-back issue process 400 is a computer-implemented process that uses distributed issue queue 300 in FIG. 3 as well as elements in FIGS. 1 and 2. The description of the back-to-back issue process 400 shown in FIG. 2 is provided with reference, where appropriate, to FIGS. 1, 2, and 3.

At block 402 of the back-to-back issue process 400, a producer instruction is fetched (e.g., via instruction fetch and decode module 202) and dispatched (e.g., via dispatch module 204) to issue queue logic 212 of distributed issue queue 300. Issue queue logic 212 can be representative of various logic circuits used in conjunction with memory elements to facilitate functions in distributed issue queue 300 (which can be included in and/or part of issue queue 208). Using issue queue logic 212 and/or caused by dispatch module 204, distributed issue queue 300 writes the producer information into a logical register entry in a logical register (LREG) lookup table 302 such that the producer information is written at the LREG entry within LREG lookup table 302 matching the logical register (e.g., R1) at which the producing instruction is writing to. Each LREG entry in the LREG lookup table 302 individually corresponds to a particular register, for example, a general purpose register (GPR) in the processor 200. It should be appreciated that logical register (e.g., R1) can be representative of any desired logical register including, for example, GPR, vector scalar registers (VSR), floating point registers (FPR), etc. In one example, each row in the LREG lookup table 302 could correspond to and/or be separately allocated to a predefined register in processor 200. There are various logical registers in processor 200, and logical register R1 is noted as an example. LREG lookup table 302 may also be considered an issue queue look up table. In LREG lookup table 302, a Q_id field holds the entry identification of the issue queue entry that is written to within the distributed issue queue 300. Particularly, the Q_id field holds the issue queue entry the producer of the respective logical register is written to within the distributed issue queue. A Q_loc field holds the entry location identifying which issue queue, for example, issue queue ISQ0 or ISQ1 (or even a third issue queue (not shown)) within distributed issue queue 300), the producer information of producer instruction has been written to. Information about the producer instruction is stored in LREG entry for the producer instruction, but the producer instruction is stored as an issue queue entry in issue queue entries 306_0 of ISQ0 or issue queue entries 306_1 of ISQ1. Issue queue entries 306_0 and 306_1 can generally be referred to as issue queue entries 306. The combination of Q_id and Q_loc represents exactly where the producer instruction is, for example, whether the issue queue entry is even/odd in issue queue entries 306_0, 306_1 and which issue queue (e.g., ISQ0/ISQ1) is being used. Also, the LREG entry itself (e.g., LREG entry #1) denotes in which logical register (e.g., register R1) the results of the producer instruction are to be written/saved. The issue queue entry can be on the even side (ev) or odd side (od), and the issue queue entry can be stored in issue queue ISQ0 or ISQ1. Although even and odd entries are illustrated for explanation purposes, this is just one example, and it is noted that the issue queue is not required to be organized by odd and even entries.

In an example scenario, issue queue logic 212 can store 8 bits of producer information for the producer instruction in LREG lookup table 302. The LREG entry can also include indication of the execution unit (VS) (e.g., 1 bit) in a VS field and a valid bit (V) in a valid bit field. The VS field indicates which execution unit the producer instruction will execute on, such as execution unit 210_0, 210_1 and/or any other execution unit. The valid bit (V) indicates whether the entry is still valid for the producer instruction.

The age matrix is written at dispatch time for all instructions (producer and consumer). When the ready (RDY) vector logic, such as RDY vector logic 310_0 or RDY vector logic 310_1, determines the instruction (e.g., the producer or consumer) is ready to issue, RDY vector logic send this information/notification to the age matrix which acts as an arbitration logic (if multiple entries are ready to issue) to determine which ready issue queue entry will win arbitration and issue. Age matrix 308_0 and age matrix 308_1 can generally be referred to as age matrix 308. RDY vector logic 310_0 and RDY vector logic 310_1 can generally be referred to as RDY vector logic 310.

At block 404, a dependent instruction reads the LREG lookup table entry in LREG lookup table 302 that matches the logical register (e.g., R1) it is sourcing. If LREG lookup table 302 reads out a valid entry (e.g., valid entry (V) bit is 1, invalid entry bit is 0), then the producer instruction has not yet executed and supports back-to-back execution. The dependent instruction is allocated to (i.e., stored in) an issue queue entry in the issue queue entries 306_0 of ISQ0 or in the issue queue entries 306_1 of ISQ1. Additionally, a back-to-back (B2B) entry is created for the dependent instruction in a B2B wakeup table, such as, for example, B2B wakeup table 304_0 in issue queue ISQ0 or B2B wakeup table 304_1 in issue queue ISQ1. The dependent instruction writes the producer information it read from the LREG lookup table 302 into its B2B entry in the B2B wakeup table 304_0, 304_1, thereby matching the LREG entry producer information. The LREG lookup table 302 may not give the full indication of a dependency but rather identifies the logical register (e.g., R1) that is sourced or needed by the dependent instruction, such that the dependent instruction can recognize the dependency (i.e., the dependency on the results of logical register R1 that will be generated by the producer instruction when the producer instruction issues). The identification of the dependency is determined by the mapper module 206. Although basic dependency detection is done in the mapper module 206, the LREG lookup table 302 provides the details necessary to support back-to-back issue as well as an indication of whether or not back-to-back issue can be performed for the producer instruction and the dependent instruction.

Figure 6:
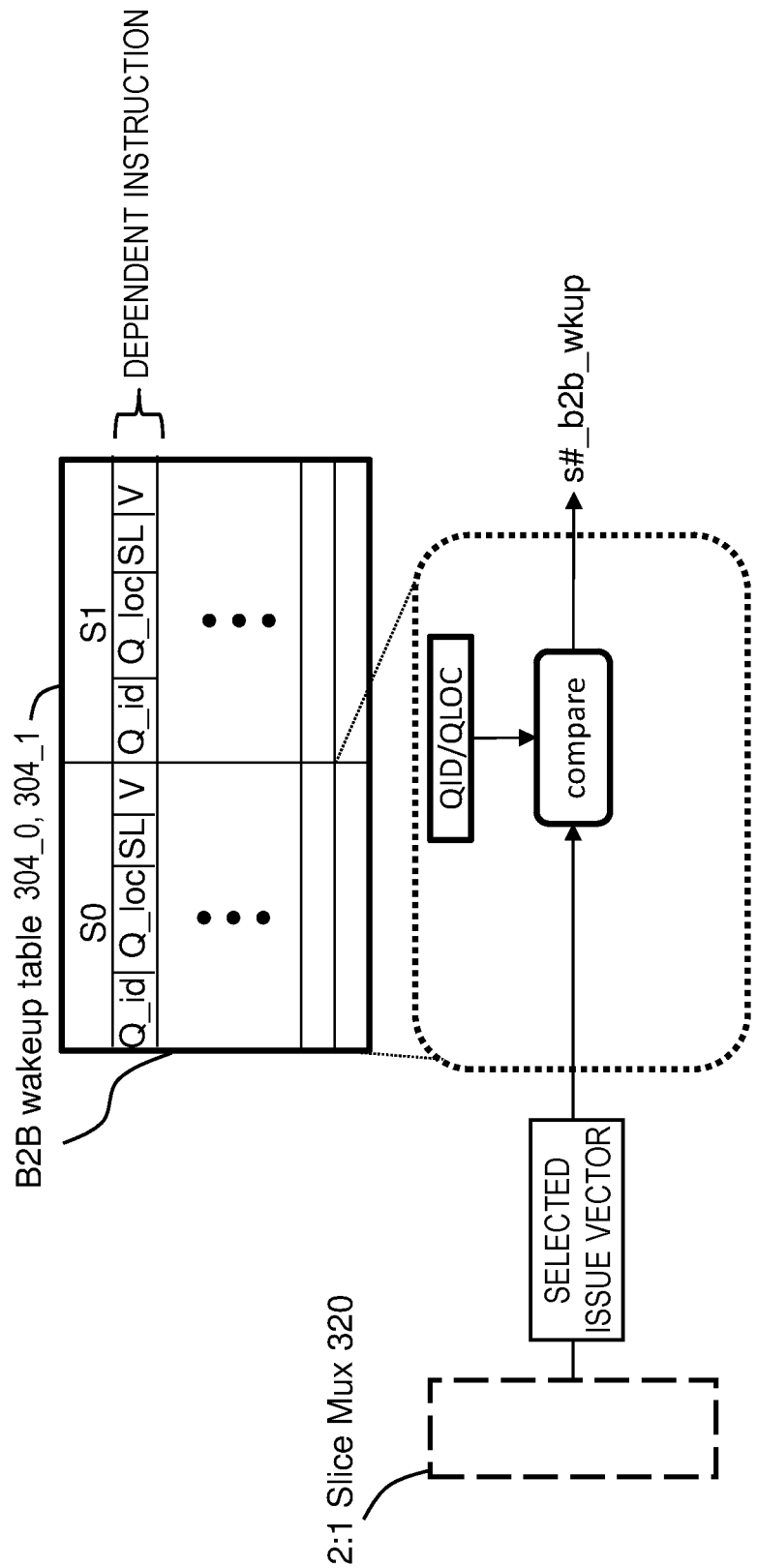
FIG. 6 depicts a block diagram illustrating details regarding a back-to-back wakeup table in accordance with one or more embodiments of the invention.

As noted above, then the dependent instruction (e.g., also referred to as the data-consumer instruction) detects a hit in the LREG lookup table 302 on the source logical register (e.g., R1), the dependent instruction can write the B2B entry in the B2B wakeup table 304_0, 304_1 as valid. A valid (V) field for the B2B wakeup table is depicted in FIG. 6. The LREG lookup table 302 is read based on dispatching the dependent instruction which has sources (e.g., source S0 and/or source S1) consuming a logical register (e.g., R1) which is supported by the LREG lookup table 302. The logical register can be a general purpose register (GPR). When the dependent instruction is written into the issue queue (ISQ0, ISQ1), it writes both the issue queue entry and the B2B wakeup table entry.

At block 406, the producer instruction issues and is sent to an execution unit, such as execution unit 210_0, execution unit 210_1, and/or any execution unit. The producer instruction can issue using any standard process for issuing instructions in an instruction pipeline as understood by one of ordinary skill in the art. For example, RDY vector logic 310 prepares the producer instruction and sends the producer instruction to age matrix 308. Age matrix 308 sends the producer instruction to the issue vector which sends the producer instruction to the issue multiplexor. In one or more embodiments, a 2:1 slice multiplexor 320 can be utilized. The 2:1 multiplexor 320 selects between the different issue queues (e.g., ISQ0, ISQ1) trying to issue to the same issue port. The 2:1 slice multiplexor selection could pick the least recently selected issue queue for this port. In one or more embodiments, the 2:1 slice multiplexor selection may not be utilized, and there could be a single issue queue; as such, there would not be selection between two instructions because there would be only one issue queue issuing the instruction at a time.

At block 408, in addition to the 2:1 slice multiplexer 320 issuing the producer instruction to an execution unit, the 2:1 slice multiplexer 320 also (e.g., concurrently) sends producer information of the previously issued producer instruction to the B2B wakeup table 304_0, 304_1. In one or more embodiments, the issue vector could send the producer information of the previously issued producer instruction to the B2B wakeup table 304_0, 304_1. The producer information coming back to the B2B wakeup table 304_0, 304_1 is the issue valid (e.g., a valid bit of 1) and the Q_id and Q_loc of the selected producer instruction.

For example, the age matrix produces the issue vector from each ISQ. This issue vector is then sent to the 2:1 multiplexer to determine which entry is actually issuing. This resultant issue vector is encoded and sent to the B2B wakeup table along with the valid bit. The issue vectors are also used in normal operation to read out the contents of the issue queue location which contains the full information for the instruction issue.

At block 410, the B2B wakeup table 304_0, 304_1 uses the Q_id and Q_loc for the producer instruction to determine that the dependent instruction is dependent on the currently issued producer instruction and the dependent instruction is to issue in the next cycle (i.e., back-to-back to the producer instruction). This intended to wake up the dependent instruction. The B2B wakeup table 304_0, 304_1 holds information by source (e.g., source S0, source S1, and so forth as depicted in FIG. 6), where the dependent instruction has at least one source (e.g., source S0, source S1, etc.) that matches and/or is the same source (or register) for producer instruction. More particularly, the sources S0, S1, etc., refer to the logical sources the dependent instruction needs for execution. These are the logical sources that were looked up in the LREG lookup table at dispatch to determine if the dependent instruction can issue back-to-back from the producer instruction of the logical register. The B2B wakeup table 304_0, 304_1 compares the Q_id and Q_loc to determine that the dependent source is now ready for issue. As noted herein, the B2B entry for the dependent instruction previously stored the Q_id and Q_loc for the producer instruction. It should be appreciated that there may be other dependencies affecting the issue of the dependent instruction, such as, for example, other sources may not be ready yet.

At block 412, the B2B wakeup table 304_0, 304_1 indicates that the given source (e.g., source S0, source S1, and/or another source related to the dependent instruction) is now ready for issue to the RDY vector logic 310_0, 310_1. The RDY vector logic 310_0, 310_1 resolves the source. In some cases, the RDY vector logic 310_0, 310_1 may determine that multiple entries (i.e., dependent instructions) are ready to issue and the age matrix 308_0, 308_1 selects the oldest requestor (i.e., oldest dependent instruction) and generates the issue vector for that dependent instruction. In other words, the B2B wakeup table 304_0, 304_1 determines/matches, using the source that the dependent instruction is dependent on, the producer information for producer instruction and causes the dependent instruction (i.e., the issue vector for the dependent instruction) to issue back-to-back to the producer instruction. As noted herein, the issue vector for the dependent instruction is sent to the 2:1 slice multiplexor 320 in order to be sent to the proper execution unit. Accordingly, the dependent instruction is sent to the execution unit for execution back-to-back to the producer instruction, such that the dependent instruction can utilize the results in the source logical register (e.g., R1) that were previously generated by the issued producer instruction.

Figure 5:
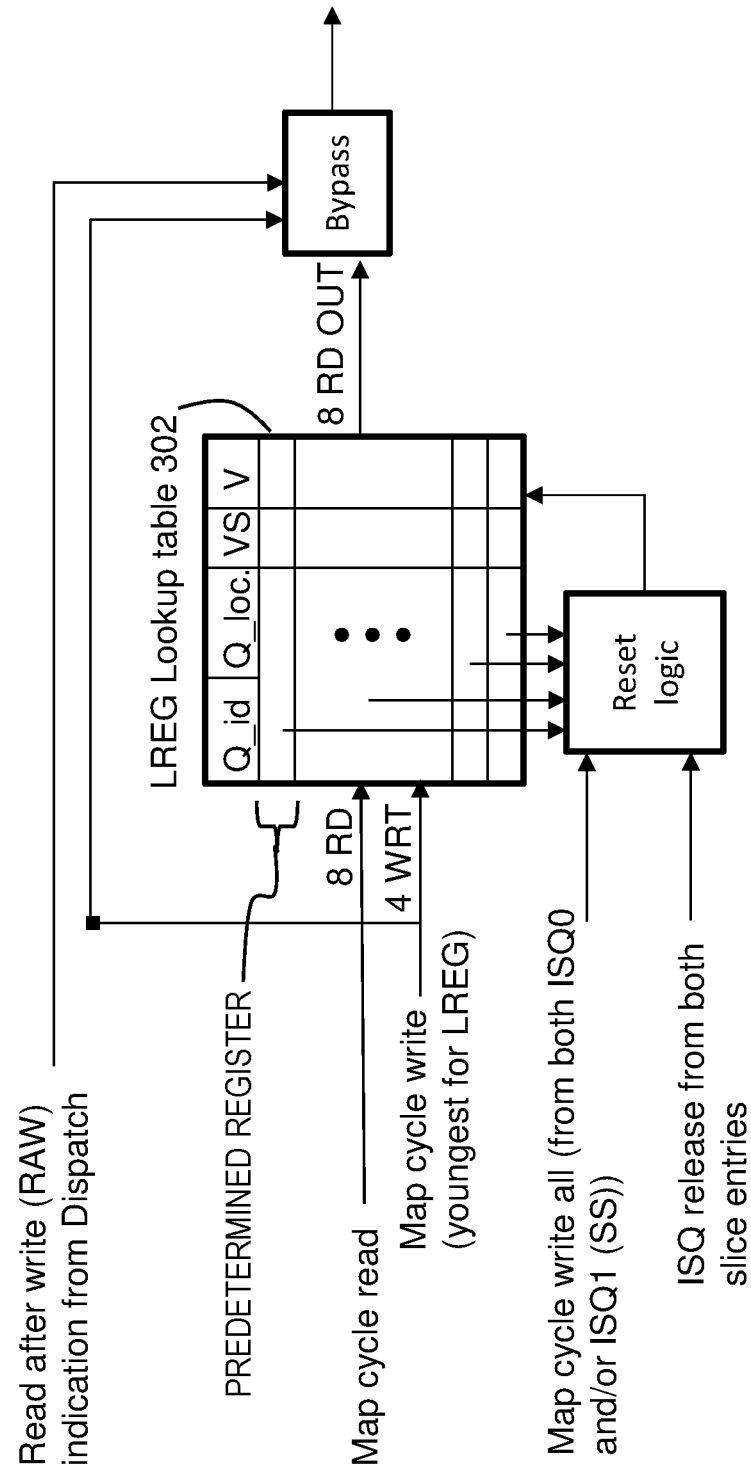
FIG. 5 depicts a block diagram illustrating details regarding a logical register lookup table in accordance with one or more embodiments of the invention.

FIG. 5 is a block diagram illustrating further details regarding the LREG lookup table 302 according to one or more embodiments. As previously discussed, the LREG lookup table includes the Q_id field, Q_loc field, VS field, and V field for each LREG entry. Distributed issue queue 300 maintains the LREG lookup table 302 of the last instruction to write a given register (e.g., GPR). For example, in one implementation the LREG lookup table 302 could be 64-deep (e.g., 64 rows for registers) to contain 32 registers (e.g., GPRs) for 2 threads. Distributed issue queue 300 is understood to be a superslice, and there is one LREG lookup table per superslice. For example, issue queue ISQ0 can be slice 0 while issue queue ISQ1 can be slice 1. In one or more embodiments, each LREG entry can hold 8 bits in which 6 bits are for Q_id and Q_loc fields, 1 bit for the VS field, and 1 bit for valid or not valid in the V field. For the producer information of the producer instruction, the Q_id identifies the entry location within the issue queue entries 306_0, 306_1, such as the identification of first issue queue entry, second issue queue, etc. The Q_loc identifies which issue queue ISQ0 or ISQ1 and the even (ev) versus odd (od) location in that issue queue entry, where for example odd=1. The VS field denotes which issue port the LREG target issued to, such as, for example, the issue port to execution unit 210_0, 210_1. In one or more embodiments, the full LREG lookup table can hold 512 bits. In one or more embodiments, the LREG lookup table can hold fewer or more bits. In one or more embodiments, each LREG entry has 8 read ports, 2 ports per instruction dispatched to this distributed issue queue 300 (i.e., superslice (SS)). If a read after write (RAW) for the source is detected, the distributed issue queue 300 does not read LREG lookup table 302 and proceeds to bypass instead.

Dependent instructions have one or more sources, such as source S0 and source S1, which may correspond to particular registers. Also, one dependent instruction could have source S0 while another dependent instruction has source S1. Each dependent instruction reads the LREG lookup table 302 for S0 and S1. In some cases, only general purpose register (GPR) LREG entries are valid for reading. One or more sources S0 and S1 can be supported based on design constraints.

In an example implementation, each LREG lookup table entry can have 4 write ports with 1 per instruction dispatched to the distributed issue queue 300 (i.e., superslice). The distributed issue queue 300 (only) sets the valid bit to '1' for cases which route to the execution unit which supports back-to-back (fixed-point instructions (FX)), and clears the valid bit (e.g., set valid to '0') for all other routes or types.

Any write to the LREG lookup table 302 across both issue queues ISQ0 and ISQ1 will clear the existing valid bit. When an issue queue entry in the issue queue entries 306_0, 306_1 is released (e.g., due to issue, flush, etc.), an ISQ release vector will propagate across the LREG lookup table entries where the LREG lookup table entry will decode its own Q_id and Q_loc and compare across to clear its valid bit. In other words, the ISQ release vector will clear the valid bit for the producer instruction of a given LREG entry in the LREG lookup table. The reset logic is intended to reset the LREG lookup table entry for a producer instruction in the LREG lookup table 302 so that a younger dependent instruction will not hit on that LREG lookup table entry.

FIG. 6 is a block diagram illustrating further details regarding the B2B wakeup table 304_0, 304_1 according to one or more embodiments. Each ISQ slice (e.g., ISQ0 and ISQ1) maintains a B2B wakeup table 304_0, 304_1 with one B2B entry per issue queue entry in issue queue entries

306_0, 306_1. For example, in one or more embodiments, a B2B wakeup table may have a total of 24 B2B entries per issue queue (slice) ISQ0 and ISQ1. In one or more embodiments, each ISQ0, ISQ1 (slice) will have its own B2B wakeup table.

In B2B wakeup table 304_0, 304_1, each B2B entry can have a Q_id field, a Q_loc field, an issue port field (e.g., SL field), and a valid bit (V) field. Each B2B entry may contain 6 bits for ISQ location (in order to identify the producer instruction), where 2 bits are for Q_loc, 4 bits are for Q_id, 1 bit for SL, and 1 bit for the valid field which indicates valid or not valid for each source (S0, S1, etc.) supported. This information gets written in the B2B entry during the dispatch cycle for the dependent instruction, for example, when dispatched by dispatch module 204.

The B2B wakeup table for an issue queue ISQ0, ISQ1 (slice) contains two compares per source. This compare (comparison) is between the Q_id and Q_loc of the producer information for the issued producer instruction sent during the issue cycle and the Q_id and Q_loc in the various B2B entries (having a valid bit active, e.g. '1') in the B2B wakeup table 304_0, 304_1. When there is a match to the information in a B2B entry, the dependent instruction source corresponding to the matched B2B entry and source (S0, S1) are sent to RDY logic for the matching entry to indicate that the source is now ready for issue, and the valid bit (e.g., for S0, S1, etc.) gets cleared for the B2B entry.

Source S0 and source S1 indicate 2 of the sources for the dependent instructions which support B2B wakeup. If only 1 source is supported, there could be just 1 source, if 3 or more sources are supported then there would be 3 or more sources in the B2B wakeup table. It should be appreciated that dependent instruction can have any number of sources, dependent on design/implementation. The ISQ entry will have its own source tracking logic which holds a ready state for all of the sources. The B2B wakeup table allows the source to wake up faster than the main entry can support. There are numerous potential dependencies that a given instruction may resolve before it can issue. These are dealt with in the ISQ entry. The purpose of the B2B wakeup table is to do the fast detect for the source wakeup to resolve the given source (e.g., sources S0 or S1 in this case) to allow RDY vector logic 310_0, 310_1 to be active faster. Moreover, the ISQ entries provide the status of the various dependencies (which include sources S0 and S1). The B2B wakeup table can use the S0 and S1 status to indicate it as resolved quicker which the RDY vector logic 310_0, 310_1 will use to indicate ready and request issue to the age matrix 308 quicker.

Figure 7:
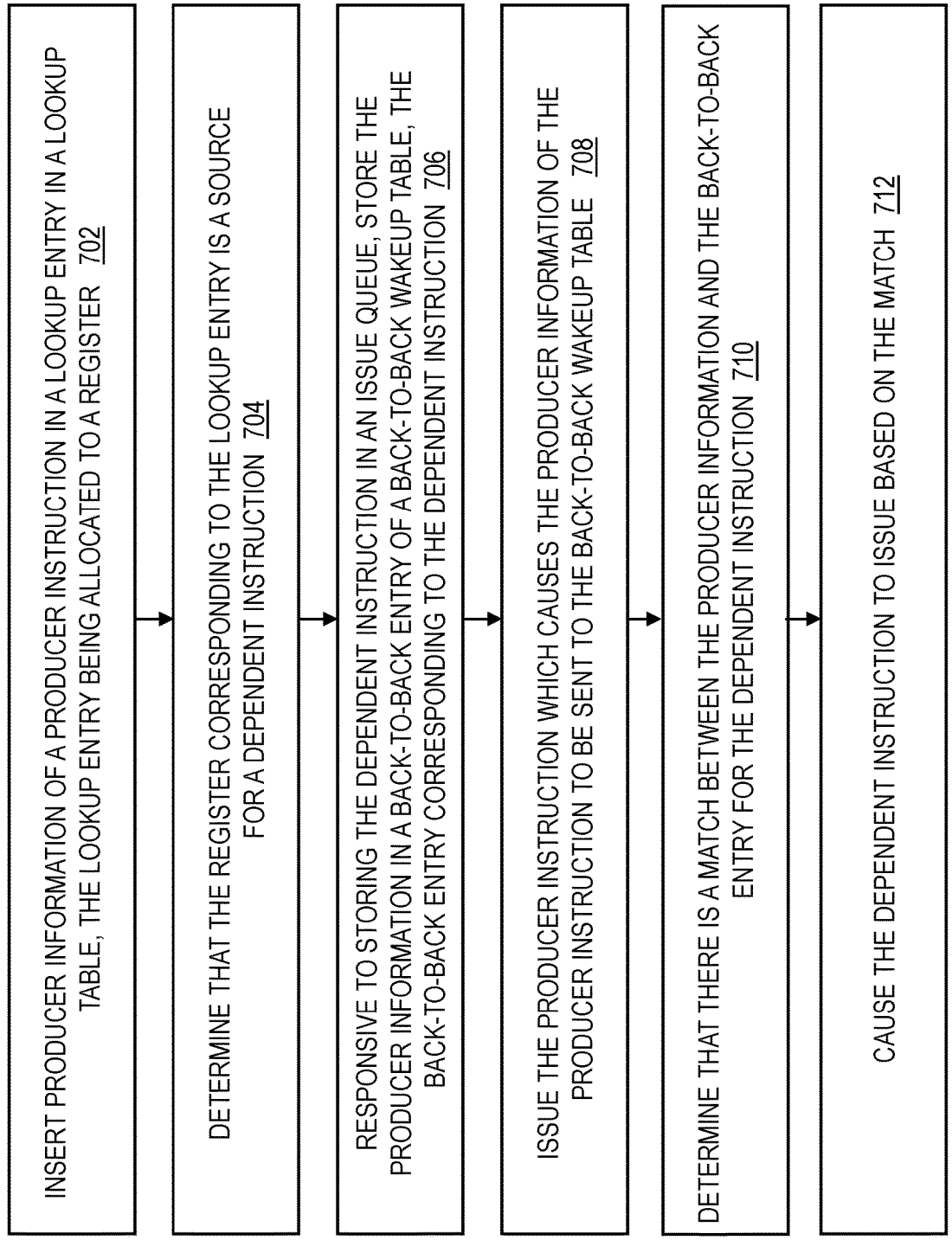
FIG. 7 is a flowchart of a computer-implemented process for fast perfect issue of dependent instructions in a distributed issue queue system (i.e., back-to-back issue) in accordance with one or more embodiments of the invention.

FIG. 7 is flowchart of a computer-implemented process 700 for fast perfect issue of dependent instructions in a distributed issue queue system (i.e., back-to-back issue) in accordance with one or more embodiments of the present invention. Computer-implemented process 700 may be performed using computer system 100 in FIG. 1. Processors 101 in FIG. 1 along with any other processor discussed herein can include and/or implement functions of processor 200 in FIG. 2. Functions of processor 200 can be used and/or implemented in hardware components of hardware and software layer 60 depicted in FIG. 9. Also, issue queue 208 can include and/or implement functions of distributed issue queue 300 in FIG. 3. Computer-implemented process 700 will be described with reference to FIGS. 1-6, 8, and 9.

At block 702, distributed issue queue 300 in processor 200 is configured to insert/store producer information of a producer instruction in a lookup entry in a lookup table (e.g., LREG lookup table 302), the lookup entry being allocated to a register (e.g., R1). The register could be one of the many registers (not shown) in processor 200. At block 704, distributed issue queue 300 is configured to determine that the register (e.g., R1) corresponding to the lookup entry is a source for a dependent instruction. At block 706, distributed issue queue 300 is configured to, responsive to storing the dependent instruction in an issue queue (e.g., issue queue ISQ0, ISQ1), storing store the producer information in a back-to-back entry of a back-to-back wakeup table (e.g., back-to-back wakeup table 304_0, 304_1), the back-to-back entry corresponding to the dependent instruction. At block 708, distributed issue queue 300 is configured to issue the producer instruction which causes the producer information of the issued/issuing producer instruction to be sent to the back-to-back wakeup table. At block 710, distributed issue queue 300 is configured to determine that there is a match between the producer information (just sent for the issued producer instruction) and the back-to-back entry for the dependent instruction. At block 712, distributed issue queue 300 is configured to cause the dependent instruction to issue based on the match with the producer information of the issued/issuing producer instruction.

The dependent instruction issues back-to-back to the producer instruction based on the match. The lookup table (e.g., LREG lookup table 302) comprises other lookup entries corresponding to other registers (e.g., R2, R3, etc., on processor 200) in addition to the lookup entry for the register (e.g., R1). The back-to-back wakeup table 304_0, 304_1 is arranged by sources, as depicted in FIG. 5. Determining that there is the match between the producer information (sent for the issued production induction) and the back-to-back entry for the dependent instruction comprises: comparing the producer information sent to the back-to-back wakeup table 304_0, 304_1 to all back-to-back entries in the back-to-back wakeup table 304_0, 304_1, and finding that the producer information sent to the back-to-back wakeup table 304_0, 304_1 matches source information (e.g., for source S0, source S1, and/or both) in the back-to-back entry for the dependent instruction.

Issuing the producer instruction causes the producer information of the issued/issuing producer instruction to be sent to a plurality of back-to-back wakeup tables. For example, the producer information is sent to both back-to-back wakeup tables 304_0, 304_1 for comparison and potential matching.

The producer instruction and the dependent instruction are not required to be stored in a same row of the issue queue in order to issue back-to-back, thereby allowing the producer instruction and the dependent instruction to be stored in different rows. In other words, the producer instruction is not required to be stored as an even (ev) entry and the dependent instruction is not required to be stored as an odd (od) entry in the same row of the issue queue entries 306_0, 306_1 in order to be issued back-to-back. Furthermore, according to one or more embodiments, the producer and dependent instructions can be placed in any issue queue and still achieve back-to-back issue, with no requirement on relative proximity within the issue queue/queues. The producer instruction and the dependent instruction are not required to be stored in a same issue queue in order to issue back-to-back, thereby allowing the producer instruction and the dependent instruction to be stored in different issue queues. In other words, in addition to not having to be on the same row of the issue queue entries 306_0, 306_1, the producer instruction is not required to be stored in the same issue queue entry 306_0, 306_1 and/or the same slice/issue queue ISQ0, ISQ1 in order to be issued back-to-back.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
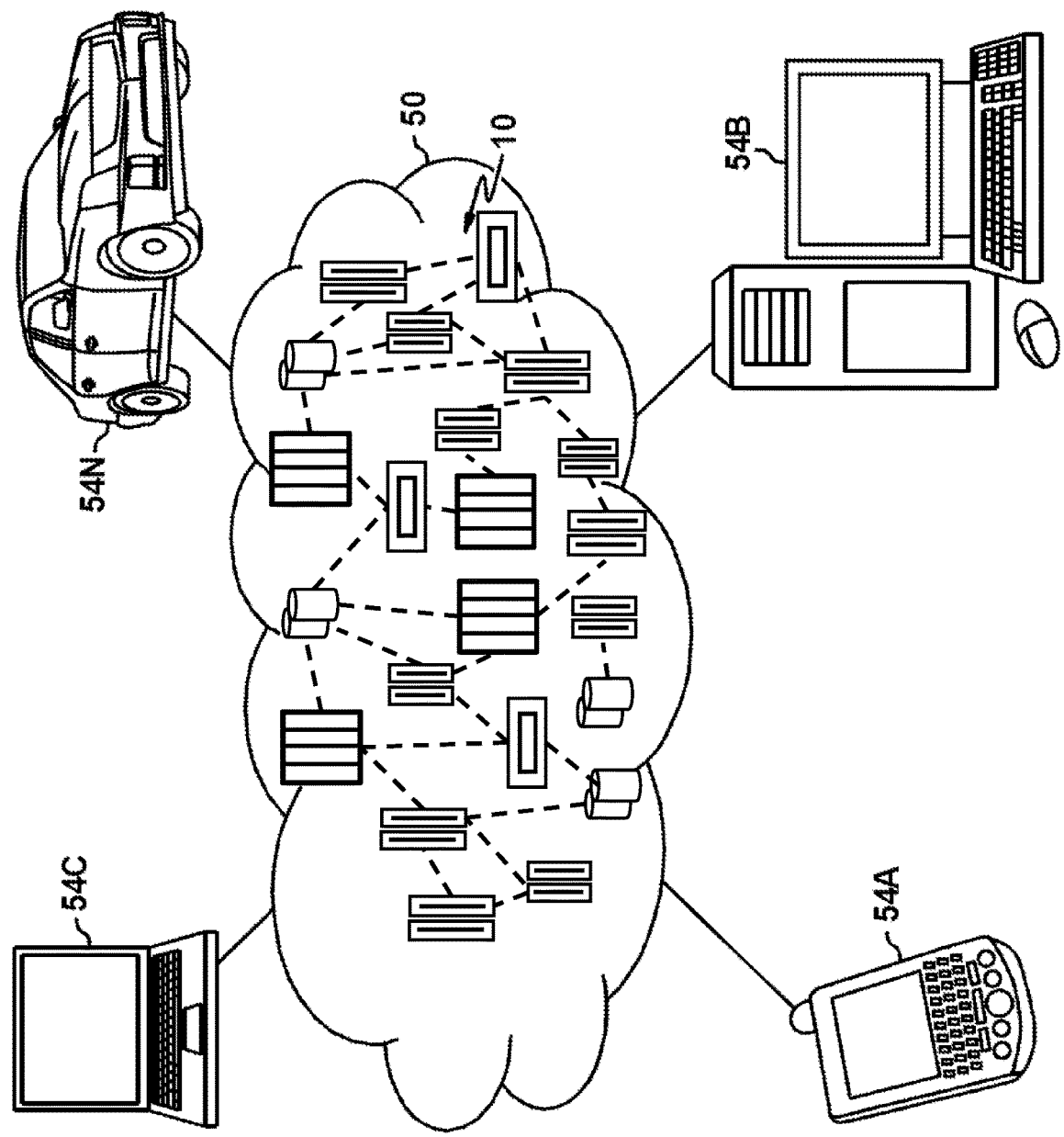
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
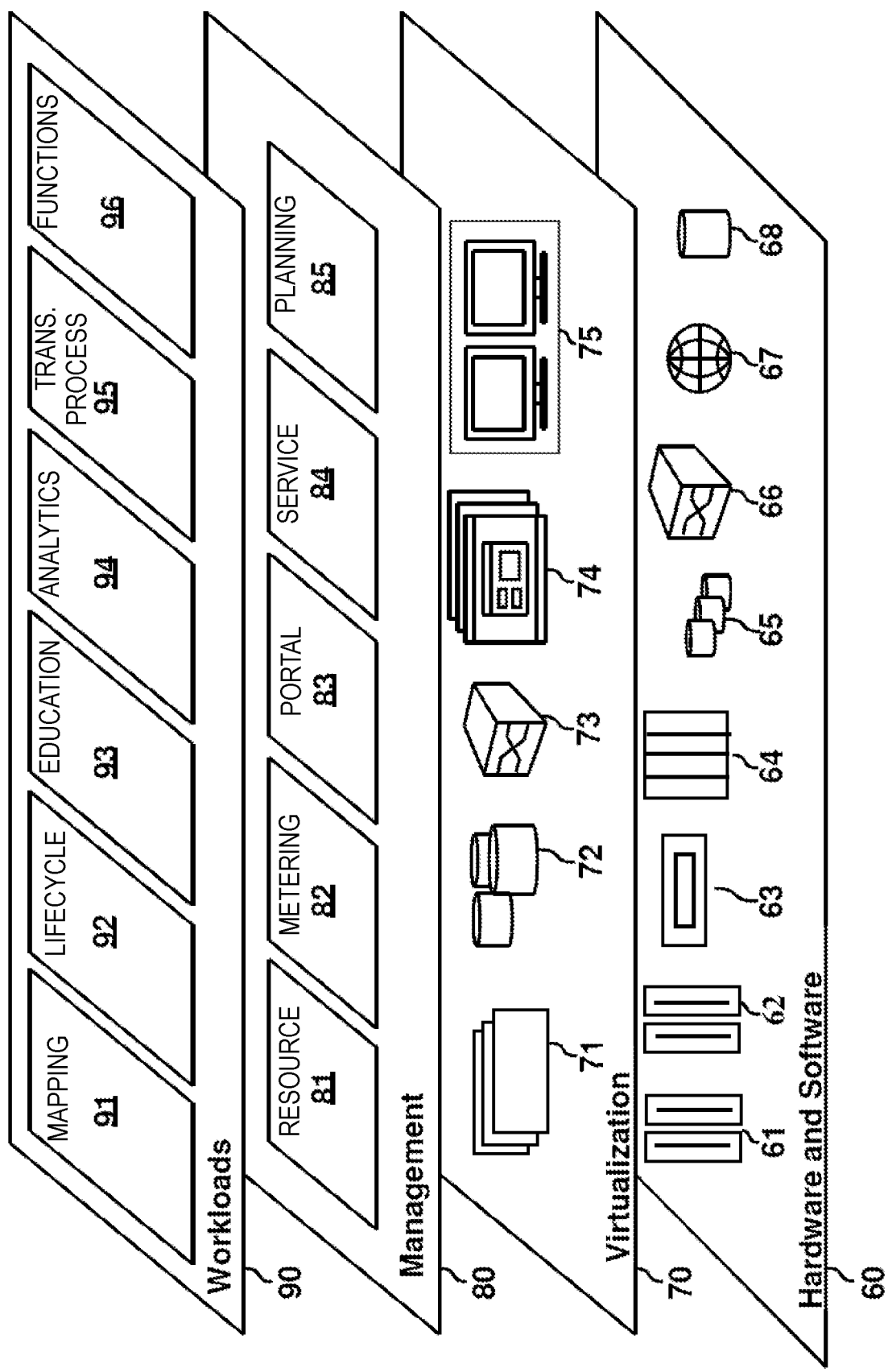
FIG. 9 depicts abstraction model layers according to one or more embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   inserting producer information of a producer instruction in a lookup entry in a lookup table, the lookup entry being allocated to a register;
   determining that the register corresponding to the lookup entry is a source for a dependent instruction;
   responsive to storing the dependent instruction in an issue queue, storing the producer information in a back-to-back entry of a back-to-back wakeup table, the back-to-back entry corresponding to the dependent instruction;
   issuing the producer instruction which causes the producer information of the producer instruction to be sent to the back-to-back wakeup table;
   determining that there is a match between the producer information and the back-to-back entry for the dependent instruction; and
   allowing the dependent instruction to issue based on the match.

2. The computer-implemented method of claim 1, wherein the dependent instruction issues back-to-back to the producer instruction based on the match.

3. The computer-implemented method of claim 1, wherein the lookup table comprises other lookup entries corresponding to other registers in addition to the lookup entry for the register.

4. The computer-implemented method of claim 1, wherein the back-to-back wakeup table is arranged by sources.

5. The computer-implemented method of claim 1, wherein determining that there is the match between the producer information and the back-to-back entry for the dependent instruction comprises:
   comparing the producer information for the producer instruction having issued and sent to the back-to-back wakeup table to all back-to-back entries in the back-to-back wakeup table; and
   finding that the producer information for the producer instruction having issued and sent to the back-to-back wakeup table matches source information in the back-to-back entry for the dependent instruction.

6. The computer-implemented method of claim 1, wherein issuing the producer instruction causes the producer information of the producer instruction to be sent to a plurality of back-to-back wakeup tables.

7. The computer-implemented method of claim 1, wherein the producer instruction and the dependent instruction are not required to be stored in a same issue queue in order to issue back-to-back, thereby allowing the producer instruction and the dependent instruction to be stored in different issue queues.

8. A system comprising:
   a memory having computer readable instructions; and
   one or more processors for executing the computer readable instructions, the computer readable instructions controlling the one or more processors to perform processes comprising:
   inserting producer information of a producer instruction in a lookup entry in a lookup table, the lookup entry being allocated to a register;
   determining that the register corresponding to the lookup entry is a source for a dependent instruction;
   responsive to storing the dependent instruction in an issue queue, storing the producer information in a back-to-back entry of a back-to-back wakeup table, the back-to-back entry corresponding to the dependent instruction;
   issuing the producer instruction which causes the producer information of the producer instruction to be sent to the back-to-back wakeup table;
   determining that there is a match between the producer information and the back-to-back entry for the dependent instruction; and
   allowing the dependent instruction to issue based on the match.

9. The system of claim 8, wherein the dependent instruction issues back-to-back to the producer instruction based on the match.

10. The system of claim 8, wherein the lookup table comprises other lookup entries corresponding to other registers in addition to the lookup entry for the register.

11. The system of claim 8, wherein the back-to-back wakeup table is arranged by sources.

12. The system of claim 8, wherein determining that there is the match between the producer information and the back-to-back entry for the dependent instruction comprises:
    comparing the producer information sent to the back-to-back wakeup table to all back-to-back entries in the back-to-back wakeup table; and
    finding that the producer information sent to the back-to-back wakeup table matches source information in the back-to-back entry for the dependent instruction.

13. The system of claim 8, wherein issuing the producer instruction causes the producer information of the producer instruction to be sent to a plurality of back-to-back wakeup tables.

14. The system of claim 8, wherein the producer instruction and the dependent instruction are not required to be stored in a same issue queue in order to issue back-to-back, thereby allowing the producer instruction and the dependent instruction to be stored in different issue queues.

15. A computer program product comprising a computer readable storage medium having program instructions embodied therewith, the program instructions executable by one or more processors to cause the one or more processors to perform processes comprising:
    inserting producer information of a producer instruction in a lookup entry in a lookup table, the lookup entry being allocated to a register;
    determining that the register corresponding to the lookup entry is a source for a dependent instruction;
    responsive to storing the dependent instruction in an issue queue, storing the producer information in a back-to-back entry of a back-to-back wakeup table, the back-to-back entry corresponding to the dependent instruction;

issuing the producer instruction which causes the producer information of the producer instruction to be sent to the back-to-back wakeup table;

determining that there is a match between the producer information and the back-to-back entry for the dependent instruction; and allowing the dependent instruction to issue based on the match.

16. The computer program product of claim 15, wherein the dependent instruction issues back-to-back to the producer instruction based on the match.

17. The computer program product of claim 15, wherein the lookup table comprises other lookup entries corresponding to other registers in addition to the lookup entry for the register.

18. The computer program product of claim 15, wherein the back-to-back wakeup table is arranged by sources.

19. The computer program product of claim 15, wherein determining that there is the match between the producer information and the back-to-back entry for the dependent instruction comprises:

comparing the producer information for the producer instruction having issued and sent to the back-to-back wakeup table to all back-to-back entries in the back-to-back wakeup table; and finding that the producer information for the producer instruction having issued and sent to the back-to-back wakeup table matches source information in the back-to-back entry for the dependent instruction.

20. The computer program product of claim 15, wherein issuing the producer instruction causes the producer information of the producer instruction to be sent to a plurality of back-to-back wakeup tables.

\* \* \* \* \*